UNITED STATES PATENT OFFICE.

FRANZ FLAECHER AND BAPTIST REUTER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

EXTRACTIVE PRODUCT FROM THE HYPOPHYSIS GLAND.

1,296,063.          Specification of Letters Patent.      Patented Mar. 4, 1919.

No Drawing.      Application filed September 25, 1912. Serial No. 722,245.

*To all whom it may concern:*

Be it known that we, FRANZ FLAECHER, Ph. D., chemist, and BAPTIST REUTER, Ph. D., chemist, citizens of the Empire of Germany, residing at Höchst-on-the-Main, Germany, have invented certain new and useful Improvements in an Extractive Product from the Hypophysis Gland, of which the following is a specification.

Our invention relates to a new and useful product which is in a stable, permanent and concentrated form the physiologically-effective element of the infundibular portion of the "hypophysis cerebri," the said product being practically free from inert and deteriorating matter.

It is known that the extract of the said hypophysis possesses a hemostatic, astringent, blood-pressure raising and labor-pains promoting effect. Attempts have been made to obtain the efficient constituent of the gland in a more or less segregated condition. But these attempts have failed to produce a stable, pure and reliable product, uniform and permanent in its action.

Our invention renders available for use the above-mentioned properties of the hypophysis in a stable, pure and concentrated form, without danger of bringing injurious bodies into the patient's system.

In order to obtain the product we proceed as follows:

We take the hypophysis extract which is prepared by extracting the well-ground infundibular portion of the hypophysis by means of slightly acidulated water, completely freeing the filtrate from albumen and evaporating it. The concentrated extract thus obtained is acidified with slightly diluted sulfuric acid, whereupon an aqueous solution of phosphotungstic acid is added until this precipitating agent no longer causes precipitation. The precipitate, which consists of the phosphotungstic compound of the active base, is well washed with water, acidified with sulfuric acid, and mixed and stirred with water so as to form a thin magma, and finally barium hydrate is added until there is a distinct alkaline reaction. The so-formed phosphotungstate of barium is filtered off, the filtrate is freed from the dissolved barium by addition of diluted sulfuric acid, taking care to avoid an excess of this acid, and is then evaporated *in vacuo* to crystallization; or the base may be precipitated by means of alcohol, acetone, etc., washed with alcohol and dried *in vacuo*.

The base thus obtained readily dissolves in water with alkaline reaction, and is difficultly soluble in alcohol, ether, ethylacetate and acetone, soluble in alkalis and acids. Our new pure and dry product forms a crystalline powder of a faint yellowish-white color, it is perfectly stable in the air, and may therefore be stored without deteriorating.

With acids, the substance forms crystalline salts, which possess the same physiological properties as the base itself and constitute new substances not claimed herein but claimed in another application.

Among the chemical characteristics of the substance the following may be enumerated: It is precipitated by the usual alkaloid reagents, such as picric acid, tannic acid, phosphotungstic acid, mercuric chlorid, mercury potassium iodid, a solution of potassium periodid, platinum chlorid, potassium bismuth iodid, etc., etc. When treated with diazotized sulfanilic acid in a solution alkaline with soda, the substance gives a red coloration. It gives the biuret-reaction, and does not yield, on addition of chlorid of iron, the green coloration characteristic of adrenalin.

Having thus particularly described our invention, what we claim is:

1. A substance possessing pressor and oxytocic activity extracted from the infundibular lobe of the pituitary gland such as can be obtained by the herein described process which comprises extracting the lobe with slightly acidulated water and precipitating the substance from said extract with phosphotungstic acid.

2. A substance as claimed in claim 1 in a solid, stable, pure and concentrated form, readily soluble in water with alkaline reaction, difficultly soluble in alcohol, ether, acetone, ethyl acetate and benzene, readily soluble in acids and alkalis, forming salts with acids, precipitated by the usual alkaloid reagents, giving a red coloration when treated with diazotized sulfanilic acid in a solution alkaline with sodium carbonate, giving the biuret-reaction, and not yielding, when treated with chlorid of iron, the green coloration characteristic of adrenalin, and being of a yellowish-white color when in a solid condition.

In testimony whereof, we affix our signatures in presence of two witnesses.

FRANZ FLAECHER.
BAPTIST REUTER.

Witnesses:
  JEAN GRUND,
  CARL GRUND.